(12) United States Patent
Thomas

(10) Patent No.: US 6,405,646 B2
(45) Date of Patent: Jun. 18, 2002

(54) NEEDLE REGISTER FOR PICKLING MACHINES

(75) Inventor: Manfred Thomas, Versmold (DE)

(73) Assignee: Schroeder Maschinenbau GmbH, Werther (DE)

( * ) Notice: Subject to any disclaimer, the term of this patent is extended or adjusted under 35 U.S.C. 154(b) by 0 days.

(21) Appl. No.: 09/845,310

(22) Filed: May 1, 2001

(30) Foreign Application Priority Data

Jun. 15, 2000 (EP) .............................................. 00112643

(51) Int. Cl.[7] ........................ A23L 1/31; A23L 3/3589; A23B 4/00; A23B 4/02; A23B 4/28
(52) U.S. Cl. ............................... 99/533; 99/532; 99/535
(58) Field of Search .......................... 99/487, 533, 532, 99/535, 516; 426/281, 323, 574, 641; 452/62, 57, 66

(56) References Cited

U.S. PATENT DOCUMENTS 2,528,204 A 10/1950 Zwosta
4,455,928 A 6/1984 Townsend
5,071,666 A * 12/1991 Handel et al. ............... 426/281
5,996,481 A * 12/1999 Townsend .................... 99/533
6,014,926 A * 1/2000 Tanaka et al. ................ 99/487

FOREIGN PATENT DOCUMENTS

| DE | 1 074 379 | 1/1961 |
| DE | 198 27 685 A1 | 12/1998 |
| EP | 0 297 592 A1 | 1/1989 |
| EP | 0 396 847 A1 | 11/1990 |
| WO | WO 80/01131 A1 | 6/1980 |

* cited by examiner

Primary Examiner—Timothy F. Simone
(74) Attorney, Agent, or Firm—Rothwell, Figg, Ernst & Manbeck

(57) ABSTRACT

Needle register for pickling machines, including one or more needles (12) that are fed with brine from a pressurized chamber (18), and valves (22) that are assigned to the individual needles for controlling the flow of brine, in which each needle (12) is connected to the pressurized chamber (18) via a piece of flexible tubing (24), and in that the valves (22) are formed by squeezing-off mechanisms (30, 34) for the pieces of flexible tubing (24).

9 Claims, 2 Drawing Sheets

NEEDLE REGISTER FOR PICKLING MACHINES

BACKGROUND OF THE INVENTION

1. Field of the Invention

The invention relates to a needle register for pickling machines, comprising one or more needles that are fed with brine from a pressurized chamber, and valves assigned to the individual needles, for controlling the flow of brine.

2. Description of the Related Art

One needle register of this type is known from DE 198 27 685 C2, in which the open, upper ends of the needles lead into the pressurized chamber; each needle thus forms a valve face for the valve needle assigned to it. The valve needles extend vertically into the pressurized chamber and out through its cover, such that a tight seal is formed but the valve needles can still be shifted. In this way, they can be manipulated from outside the pressurized chamber. The opening and closing of the valves is controlled via the relative movement between the needle register and a plate clamp, as is common in pickling machines. When the needle register and the needles are lowered, the plate clamp comes to rest against the item to be pickled, while the needles are inserted into it. With this known design, a high degree of functional reliability, ease of cleaning, and a low susceptibility to valve contamination are achieved.

SUMMARY OF THE INVENTION

The object of the invention is to simplify the design of the valves while retaining the high degree of functional reliability and to further decrease susceptibility to contamination.

This object is attained in accordance with the invention in that each needle is attached to the pressurized chamber via a piece of flexible tubing, and in that the valves are formed by squeezing-off mechanisms assigned to the pieces of flexible tubing.

In accordance with the invention, the closing of the valves is accomplished by squeezing off the pieces of flexible tubing. In contrast with traditional valve constructions, a precise fit between the valve needle and the valve face is not necessary, hence the high degree of functional reliability can be retained with a simplified construction and lower manufacturing costs. When squeezed off, the flexible material of the pieces of tubing ensures that the valves close completely, so that contamination and dimensional tolerances determined by manufacturing can be tolerated at a much higher level than with the traditional construction.

Furthermore, the pieces of flexible tubing allow greater constructive freedom in terms of the arrangement and design of the valve mechanics.

Advantageous embodiments of the invention are given in the sub-claims.

The flexible pieces of tubing are preferably comprised of a rubber-elastic material, such as silicon rubber, that will not be chemically altered by the pickling brine. Because of their inherent elasticity, the pieces of flexible tubing can also provide the restoring force for the squeezing-off mechanisms, thus allowing further design simplification.

The pieces of flexible tubing may be designed simply as short connecting pieces that are placed on the upper ends of the pickling needles, which lead into the pressurized chamber.

The squeezing-off mechanism is preferably formed by a compression element that can be moved laterally in relation to the piece of flexible tubing, and by an abutment that is attached firmly in relation to the needles to the side of the piece of flexible tubing that is opposite the compression element. Further, the lower section of the abutment may be designed as a bushing, in which the upper end of the needle and the piece of flexible tubing that is placed on the needle are fastened.

In principle, each needle may be equipped with a separate operating mechanism, so that the needles are individually controllable. In one preferred embodiment, however, the needles are combined into one or more groups, whose compression elements are controlled by a common operating mechanism. In this case, the operating mechanism can be designed as a tappet that extends, leakproof, through the wall of the pressurized chamber. The advantage of this design is that for each group of needles only a single pressure-tight lead-in for the tappet need be provided in the pressurized chamber. The compression elements for all the needles in the group can then be formed by a latticed gate, the lattice openings of which conform to the placement of the needles. If the pressurized chamber has a removable cover, the gate can simply be placed in the pressurized chamber after the cover has been removed.

With needle registers that have a relatively large working area it may occur that in pickling smaller items only some of the needles are needed. In this case, it is possible to replace the gate, which is operated via the tappet, with a smaller gate, and to close off the unused needles via a separate gate that is mounted in the pressurized chamber such that it cannot move.

For operating the tappet, all known operating mechanisms present possible options, including cam or lever controls, or even pneumatic, hydraulic, or electric controls.

BRIEF DESCRIPTION OF THE SEVERAL VIEWS OF THE DRAWINGS

Below, one exemplary embodiment of the invention will be specified in greater detail by way of the diagrams.

These show.

DETAILED DESCRIPTION OF THE PREFERRED EMBODIMENTS

Figure 1:
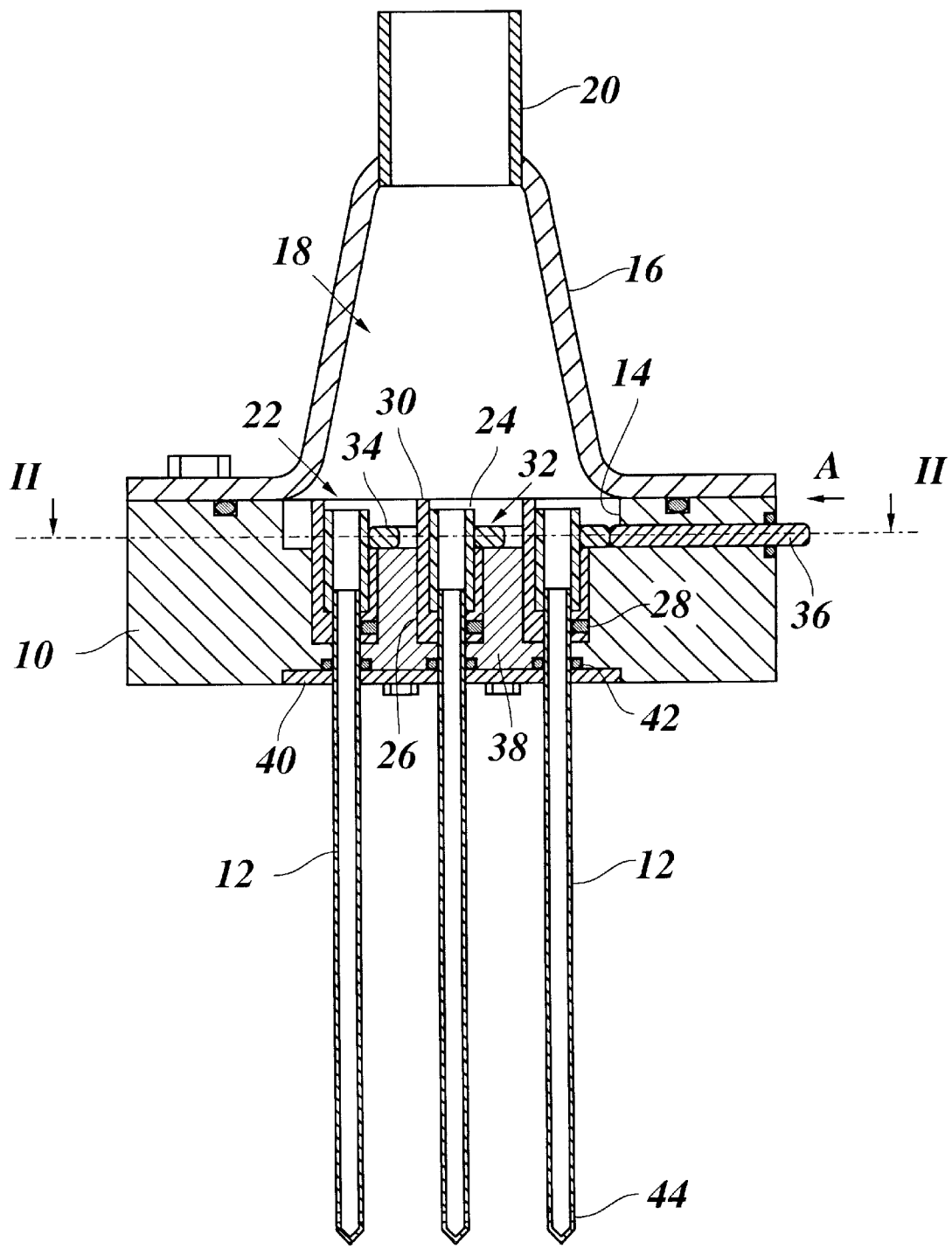
FIG. 1: a cross-section of a needle register.

The needle register shown in FIG. 1 comprises a base element 10, which is attached via known methods to a pickling machine, such that the register can be moved up and down in the machine via a drive mechanism that is not illustrated here. A number of hollow needles 12 are mounted in the base element 10 such that they can be removed; these extend downward from the base element 10, parallel to one another, such that when the needle register is lowered the needles pierce the item to be pickled, which is not depicted here. In the upper side of the base element 10 is a shallow recessed area 14, which forms a pressurized chamber 18 when joined with a cover 16 that is attached to the base element such that it is liquid-tight but removable. The cover 16 is equipped with a pouring inlet 20, through which the pickling brine is fed into the pressurized chamber 18 by a pump, which is not illustrated here.

Each needle 12 is equipped with a valve 22 at its upper end within the pressurized chamber 18. In the position illustrated in FIG. 1, the valves 22 are open, so that the needles are in a fluid connection with the pressurized chamber 18.

Each valve 22 is provided with a short piece of flexible tubing 24 made of silicon rubber, which is placed on the upper end of the needle. This piece of flexible tubing 24 and the upper end of the needle are enclosed by a bushing 26, which is attached to the needle 12 via a headless screw 28, and forms an abutment 30 at its upper end which lies adjacent to one side of the flexible tubing 24.

A flat, latticed gate 32 rests loosely on the base of the recessed area 14, and the pieces of flexible tubing 24 and the abutments 30 for the middle and the right needles in FIG. 1 are each taken up in one opening in the latticed gate 32. The lattice bars of the gate 32 form compression elements 34, each of which lies adjacent to the side of the piece of flexible tubing 24 that is opposite the abutment 30. The gate 32 can be moved laterally in relation to the needles 12, along the base of the recessed area 14, and is manipulated via a tappet 36, that is inserted in the base element 10 such that it is liquid-tight but can be shifted, and in FIG. 1 extends to the right of the base element 10. The bushings 26 and the needles 12 are held in the base element 10 by a mounting block 38 and an end plate 40. The openings for the needles 12 through the end plate 40 are closed off with gaskets 42.

Figure 2:
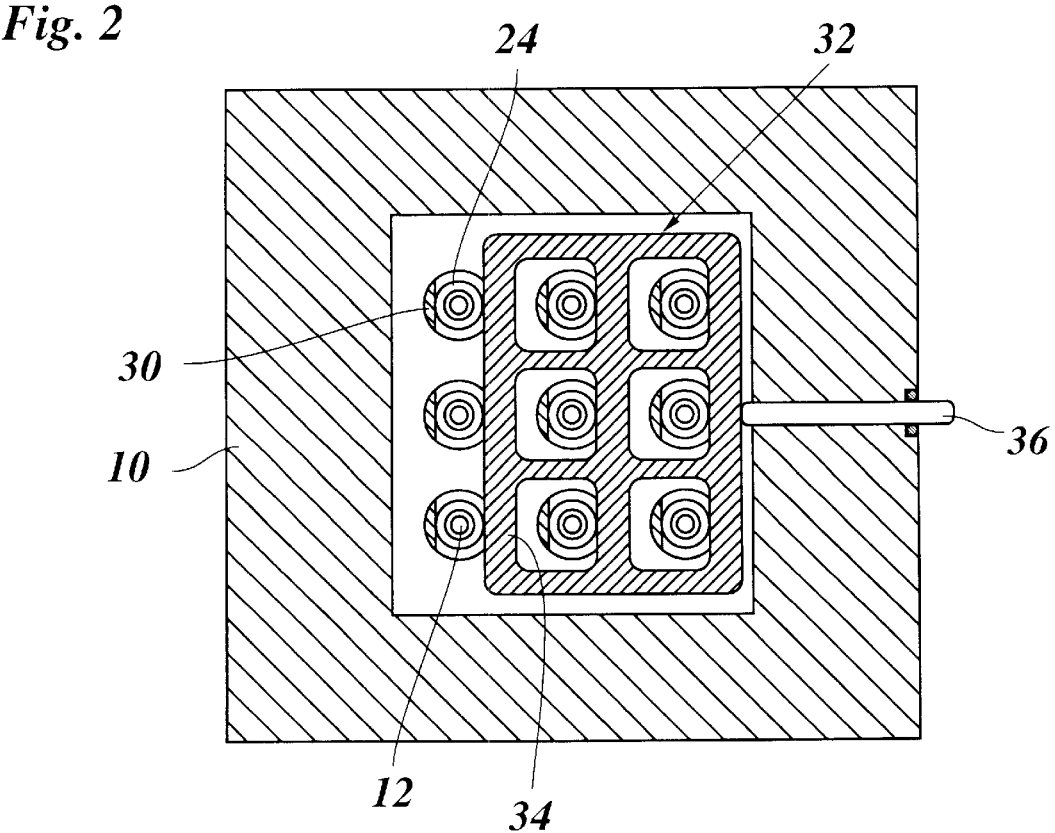
FIG. 2: a cross-section through the needle register along the line II—II in FIG. 1.

As illustrated in FIG. 2, the needles 12 are positioned in several rows and columns in a rectangular grid. In practice, the width of the needle register and the number of needles can be considerably greater than is shown in the example. However, FIG. 2 allows the lattice shape of the gate 32 and the placement of the gate in relation to the abutments 30 and the pieces of flexible tubing 24 to be seen.

When the needle register is lowered and the needles 12 are inserted into the item to be pickled, then the valves 22 are open, as is shown in FIG. 1. The pickling brine, which is held under pressure, is then released from the pressurized chamber 18 and is injected into the item to be pickled through openings 44 in the lower ends of the needles 12.

Figure 3:
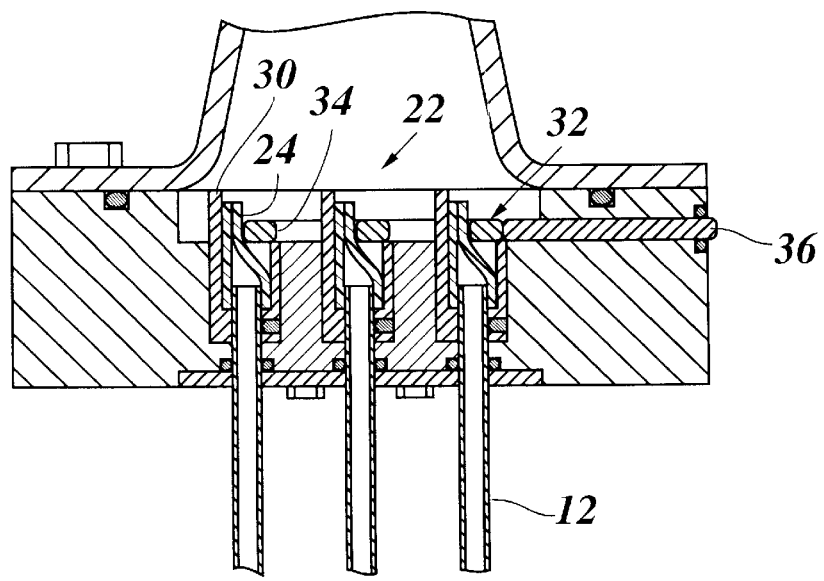
FIG. 3: a partial cross-section through the needle register as depicted in FIG. 1, in which the valves are closed.

When the needle register is again raised and the needles 12 are pulled out of the item being pickled, then the tappet 36 is thrown in the direction of the arrow A in FIG. 1 by an operating mechanism that is not illustrated here, causing the gate 32 to be shifted, against the elastic restoring force of the pieces of flexible tubing 24, into the position shown in FIG. 3. In this position, each piece of flexible tubing 24 is squeezed-off between its abutment 30 and its compression element 34. Thus the compression elements 34 and the abutments 30 together form a squeezing-off mechanism for squeezing-off the pieces of flexible tubing 24, and thus for closing the valves.

When the needle register is again lowered in the subsequent cycle, then the tappet 36 is released by the operating mechanism, and the gate 32 is returned to the position shown in FIG. 1 by virtue of the elastic restoring force of the pieces of flexible tubing 24, thus allowing pickling brine to again be injected.

What is claimed is:

1. A needle register for pickling machines, comprised of:

a pressurized chamber holding brine;

a needle that is fed with a flow of said brine from said pressurized chamber;

said needle having a valve for controlling the flow of brine;

said needle being connected to the pressurized chamber with a piece of flexible tubing; and wherein the valve comprises a squeezing-off mechanism for the piece of flexible tubing.

2. The needle register in accordance with claim 1, wherein:

the piece of flexible tubing is comprised of a rubber elastic material having a restoring force;

the restoring force being provided for the squeezing-off mechanism.

3. The needle register in accordance with claim 1, wherein the piece of flexible tubing is placed on an open end of the needle within the pressurized chamber.

4. The needle register in accordance with claim 1, wherein the squeezing-off mechanism is comprised of:

a compression element that can be moved laterally in relation to the needle;

the piece of flexible tubing; and an abutment that is positioned on a side of the piece of flexible tubing that lies opposite the compression element.

5. The needle register in accordance with claim 4, wherein the needle comprises further:

a bushing mounted on the needle and encloses said open end; and wherein the abutment is part of the bushing.

6. The needle register in accordance with claim 4, wherein: said pressurized chamber includes a wall;

the squeezing-off mechanism includes a liquid-tight tappet;

said tappet extending through said wall; and the compression element is operated with the tappet.

7. The needle register in accordance with claim 6, wherein the compression element comprises a latticed gate that can be moved with the tappet.

8. The needle register in accordance with claim 7, wherein:

the pressurized chamber comprises a flat base; and the latticed gate rests on the flat base.

9. The needle register in accordance with claim 7, wherein:

the pressurized chamber comprises a removable cover, said removable cover sealing said base; and wherein the gate, the end of the piece of flexible tubing, and the needles are openly accessible after the cover has been removed.

* * * * *